(12) United States Patent
Lain et al.

(10) Patent No.: US 7,926,028 B2
(45) Date of Patent: Apr. 12, 2011

(54) COMPUTER IMPLEMENTED PROCESS FOR IDENTIFYING CONFLICTS BETWEEN POLICIES

(75) Inventors: Antonio Lain, Menlo Park, CA (US); Patrick Goldsack, Chipping Sodbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1269 days.

(21) Appl. No.: 11/490,901

(22) Filed: Jul. 21, 2006

(65) Prior Publication Data

US 2007/0101312 A1 May 3, 2007

(30) Foreign Application Priority Data

Oct. 29, 2005 (GB) .................... 0522098.3

(51) Int. Cl.
*G06F 9/44* (2006.01)
(52) U.S. Cl. ........ 717/106; 717/108; 717/110; 717/111; 717/113; 717/116
(58) Field of Classification Search .................. 717/106, 717/108, 110, 111, 113, 116
See application file for complete search history.

(56) References Cited

U.S. PATENT DOCUMENTS

| | | | | |
|---|---|---|---|---|
| 5,787,427 | A | 7/1998 | Benantar et al. | 707/9 |
| 6,243,747 | B1 | 6/2001 | Lewis et al. | 709/220 |
| 6,327,618 | B1 * | 12/2001 | Ahlstrom et al. | 709/223 |
| 7,035,850 | B2 * | 4/2006 | Arai et al. | 709/225 |
| 7,418,489 | B2 * | 8/2008 | Sanghvi et al. | 709/223 |
| 7,552,212 | B2 * | 6/2009 | Chagoly et al. | 709/224 |

OTHER PUBLICATIONS

Dursan, T., et al., "POLICE Distributed Conflict Detection Architecture", 2004 IEEE International Conference on Communications, vol. 4, pp. 2081-2085 (2004).
Lupu, E., et al., "Conflicts in Policy Based Distributed Systems Management", IEEE Transactions on Software Engineering, Nov./Dec. 1999, vol. 25, No. 6, pp. 852-869 (1999).
DCE(Distributed Computing Environment) retrieved Mar. 21, 2007 from http://docs.hp.com/en/5964-5283/ch05s04.html?jumpid=reg_R1002_USEN, HP, p. 1-5.
Methods for Conflict Resolution in policy Based Management Systems-Dunlop, Indulska, & Raymond-7th International Enterprise Distributed Oblect Computing Conference (EDOC '03) p. 98.

* cited by examiner

*Primary Examiner* — Wei Y Zhen
*Assistant Examiner* — Qamrun Nahar

(57) ABSTRACT

A computer implemented process for identifying conflicts between policies for a method invocable by an object is described, in which the method is a member of at least one statically defined method grouping having a corresponding policy. The process comprises, for each method grouping, obtaining each method which is a member of the method grouping, associating therewith the corresponding method grouping policy, and comparing policies associated with methods which are members of two or more method groupings to identify conflicts.

13 Claims, 6 Drawing Sheets

| METHOD SIGNATURE 704 | ACL 706 |
|---|---|
| MS1 | ACLX |
| MS2 | - |
| ... | ... |

FIG. 7

COMPUTER IMPLEMENTED PROCESS FOR IDENTIFYING CONFLICTS BETWEEN POLICIES

FIELD OF THE INVENTION

The invention relates to a computer implemented process for identifying conflicts between policies.

BACKGROUND OF THE INVENTION

Object oriented programming, in which an object defines both data and the operations to be performed on the data, is a field that is well known to the skilled reader. In object oriented programming a class is defined providing a template of attributes defining data and methods defining operations and an object corresponding to the template is created by instantiating the class as shown in FIG. 1 to provide an object 100 having a description including one or more attributes 102 and one or more methods 104, the methods further being identified by associated arguments.

The methods can be defined within the object or, as shown in FIG. 2 may be invoked from another object. For example an Object 1, reference numeral 200 may call Method 1, reference numeral 202 from Object 2, reference numeral 204.

In a remote method invocation (RMI) system the Method 1 may then be invoked from another location. For example in programming languages such as Java a group of methods is described in an interface. An interface comprises a statically defined grouping of methods which can be declared in the object when it is instantiated or can be defined in the class. At compile time all of the methods associated with the object by the interfaces are then discovered by known techniques such as introspection whereby the methods associated with the interfaces are collated from inspection of the interfaces. Then, in run time, and referring once again to FIG. 2, therefore, Object 2 invokes Method 1 from Interface 1, reference numeral 206.

It is convenient to associate a common security policy 208 to all the methods contained in an interface 206. This is particularly useful when, in languages like Java, methods that are remotely accessible for example by using RMI and therefore particularly vulnerable are marked by declaring them as part of a "remote" interface. The policy may be implemented for example as an access control system in the form of an access control list (ACL) determining, for security purpose, who may invoke the method. The ACL associated with the interface is specified within the object itself in an interface/ACL pair, the ACL being associated when the object is created and selected according to any appropriate approach. For example it can be part of the description creating the object or can be retrieved from an ACL database as appropriate. Various languages are provided describing access control policies and associating policies to interfaces, such as DTEL++ which is described in "Scaleable access control for distributed object systems" of Sterne et al, proceedings of the Eighth Usenix Security Symposium Washington D.C. USA Aug. 23 to 26, 1999 which is incorporated herein by reference.

BRIEF SUMMARY OF THE INVENTION

A computer implemented process for identifying conflicts between policies for a method invocable by an object is described, in which the method is a member of at least one statically defined method grouping having a corresponding policy. The process comprises, for each method grouping, obtaining each method which is a member of the method grouping, associating therewith the corresponding method grouping policy, and comparing policies associated with methods which are members of two or more method groupings to identify conflicts.

BRIEF DESCRIPTION OF THE DRAWINGS

FIG. 7 is a schematic diagram showing a table of policies associated with method identifiers.

DETAILED DESCRIPTION OF THE INVENTION

Figure 1:
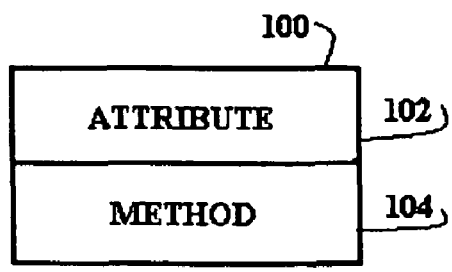
FIG. 1 is a schematic diagram illustrating an object; method.
Figure 2:
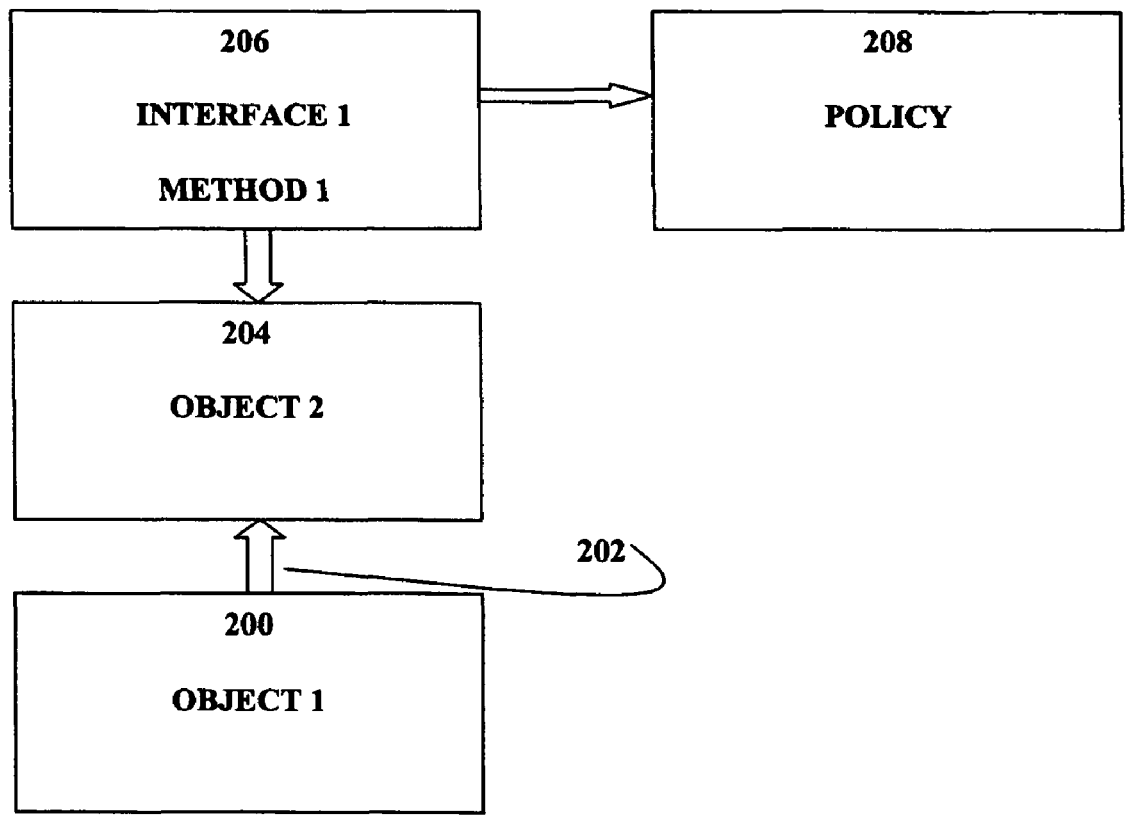
FIG. 2 is a schematic diagram illustrating method indication by an object.
Figure 5:
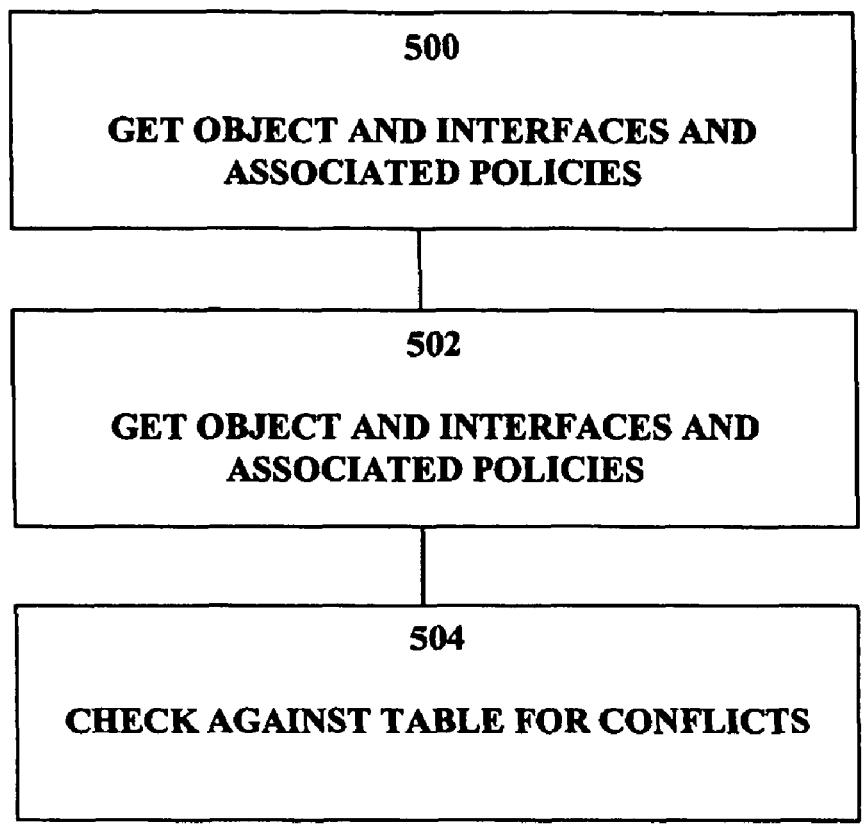
FIG. 5 is a flow diagram showing a process for identifying conflicts in method invocation.
Figure 3:
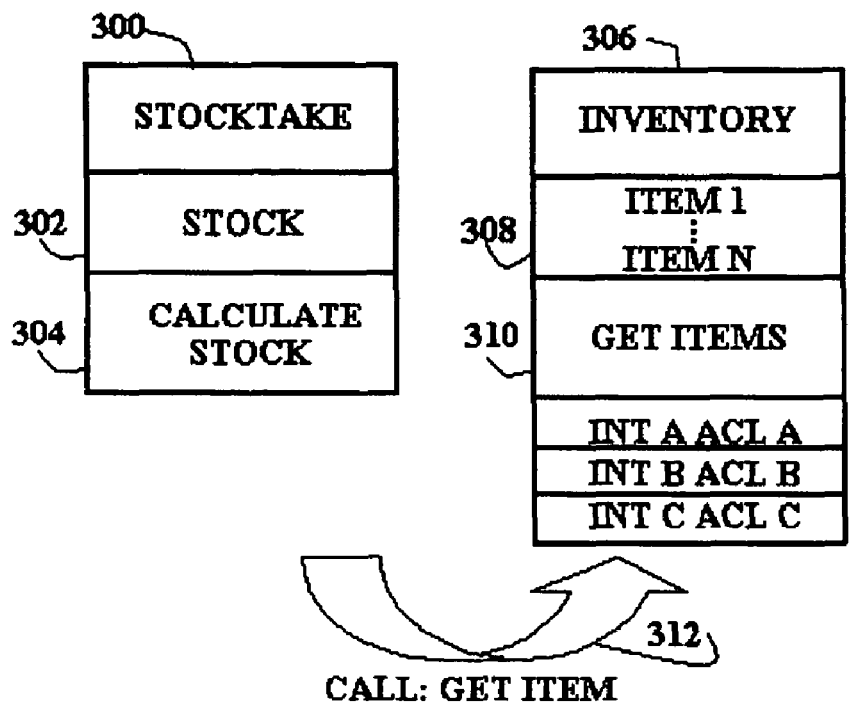
FIG. 3 is a schematic diagram showing an exemplary object interaction.
Figure 4:
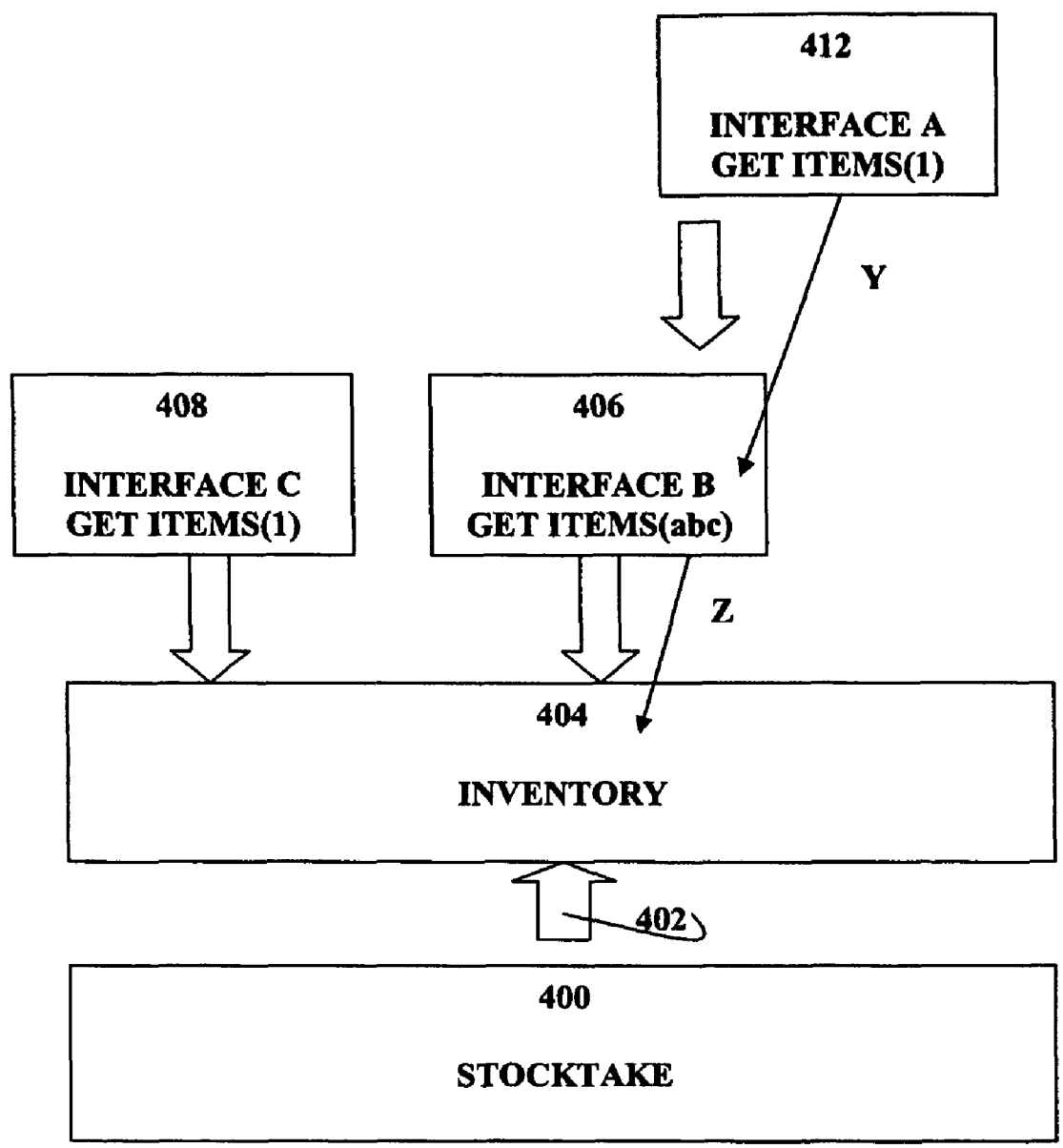
FIG. 4 is a schematic diagram showing method invocation by an object according to the method described herein.

In overview the method described herein can be understood with reference to FIG. 3 to 5. Referring firstly to FIG. 3 an interaction between two exemplary objects is shown where object 1 is named "stocktake" and object 2 is named "inventory". The stocktake object 300, includes as an attribute 302, STOCK and as a method 304, CALCULATE. The inventory Object 306 includes as an attribute 308 ITEM 1 to ITEM N and as methods GET ITEMS (1), GET ITEMS (abc) 310. For the purposes of illustration it will be noted that two methods with the common name GET ITEMS are included in the object. This is because in some implementations it is possible to "overload" a method name such that two different methods may have the same name, for example. In such implementations the methods are distinguished by an associated argument which may be a string or integer. For example in the case of the overloaded method name GET ITEMS, GET ITEMS (1) has an integer argument which could be distinguished from other integer arguments or any string argument whereas GET ITEMS (abc) has a string argument distinguishable from other string arguments or any integer argument. In addition each object lists its interface/ACL pairs. For example the inventory object 306 may list, at 314, the interface/ACL pairs that it implements, for example an interface A may have an associated ACLA, interface B has ACLB and interface C has ACLC. Accordingly in order for the stocktake Object to perform the operation CALCULATE STOCK it needs to call, say, the method GET ITEMS (1) as shown by arrow 312 from the inventory Object which then invokes the method applying the policy corresponding to the appropriate interface according to the interface/ACL pair as discussed in more detail below. The inventory Object then returns the information to the stocktake object which can then populate the attribute STOCK with the returned data. In the present example it is assumed that each ACL or policy associated with the relevant interface dictates that the method is only useable by a predetermined group for example executives, managers, warehouse operatives and so forth.

FIG. 4 shows conceptually one manner in which the relationship between objects and multiple interfaces can be expressed. it will be seen that protection or resolution of conflicts between policies is required in some cases, for example, when a method is called from multiple interfaces by an object itself where each interface may have a different policy associated with it and its methods and may itself inherit methods from one or more "parent" interfaces. For example the stock-take object 400 may call method 1 402, for example the GET ITEMS (1) method from the inventory object 404 which then invokes the method. It can be seen that a complex hierarchical interface structure may be encountered including interfaces A, B, C, reference numerals 412, 406, 408, directly invocable by the inventory object. In addition one or more of the directly invocable interfaces may themselves inherit the method from further interfaces. For example interface B 406 may inherit from parent interface A, reference numeral 412.

In the present example, where interface B 406 inherits method GET ITEMS (1) 402 from interface A 412 as shown by arrows Y and Z, and interface C also describes GET ITEMS (1) conflicts can arise where different policies are associated with each of the interfaces A, B or C. Because the ACL's are typically associated with the object as it is created, whereas the methods and interfaces it implements are determined by the class, it can be seen therefore that conflicting policies for the same method can arise if the ACLs are inconsistent. For example the inventory object may specify by its interface ACL packages 314 in FIG. 3 that interface A has a policy ACLA that only executives may perform the GET ITEMS method whereas interface B has a policy ACLB that only managers can perform the GET ITEMS method. The process described herein deals with the added complexity resulting from describing groups of methods via interfaces and in particular ensures that conflicting policies are not introduced by using different interfaces that have, or inherit, common methods, by detecting such conflicts. In particular because the specific interface used to invoke the method by the remote client is not known or at least not necessarily trusted, the problems that would otherwise arise with correct enforcement of conflicting policies do not occur and the actual method invoked can be relied on instead.

The specific examples described herein are expressed in terms of the Java language although it will be appreciated that the steps involved can be implemented in any appropriate manner in relation to any appropriate language where multiple inheritance is supported and a one-to-one mapping to actual methods is not required such that a method can be described in multiple interfaces or none, as in all of these cases it is vital to ensure that a consistent security policy is available when different policies are associated to different interfaces.

Conflict detection can be understood, in overview, referring to FIG. 5. At step 500 all interfaces associated with the target object together with their corresponding policies are obtained and at step 502, all of the methods implemented by each of the interfaces and/or any of its super-interfaces are discovered. At step 504 it can be established whether more than one policy is associated with the same method by checking against a look-up table which can be dynamically populated during execution of the process as discussed in more detail below. In addition appropriate steps can be taken to allow differentiation between methods that have common names but differ in static parameter types, i.e. arguments, again as described in more detail below.

As a result conflicting policies are not enforced for object method invocation policies as specified at the level of interfaces. This is because the interface selected by the client for the invocation is irrelevant and security decisions in the server are based on the actual method implemented by the class of which the object is an instance and not on the interface.

It will be appreciated that the processes described as follows can be implemented at any appropriate time for example during development and either statically or dynamically as appropriate. For example when it is desired to deploy a new object appropriate checks can be carried out to ensure that there are no conflicts arising from multiple interfaces associated with the object and this can be carried out off-line or on-line as an object is created or as a method is called.

Figure 6:
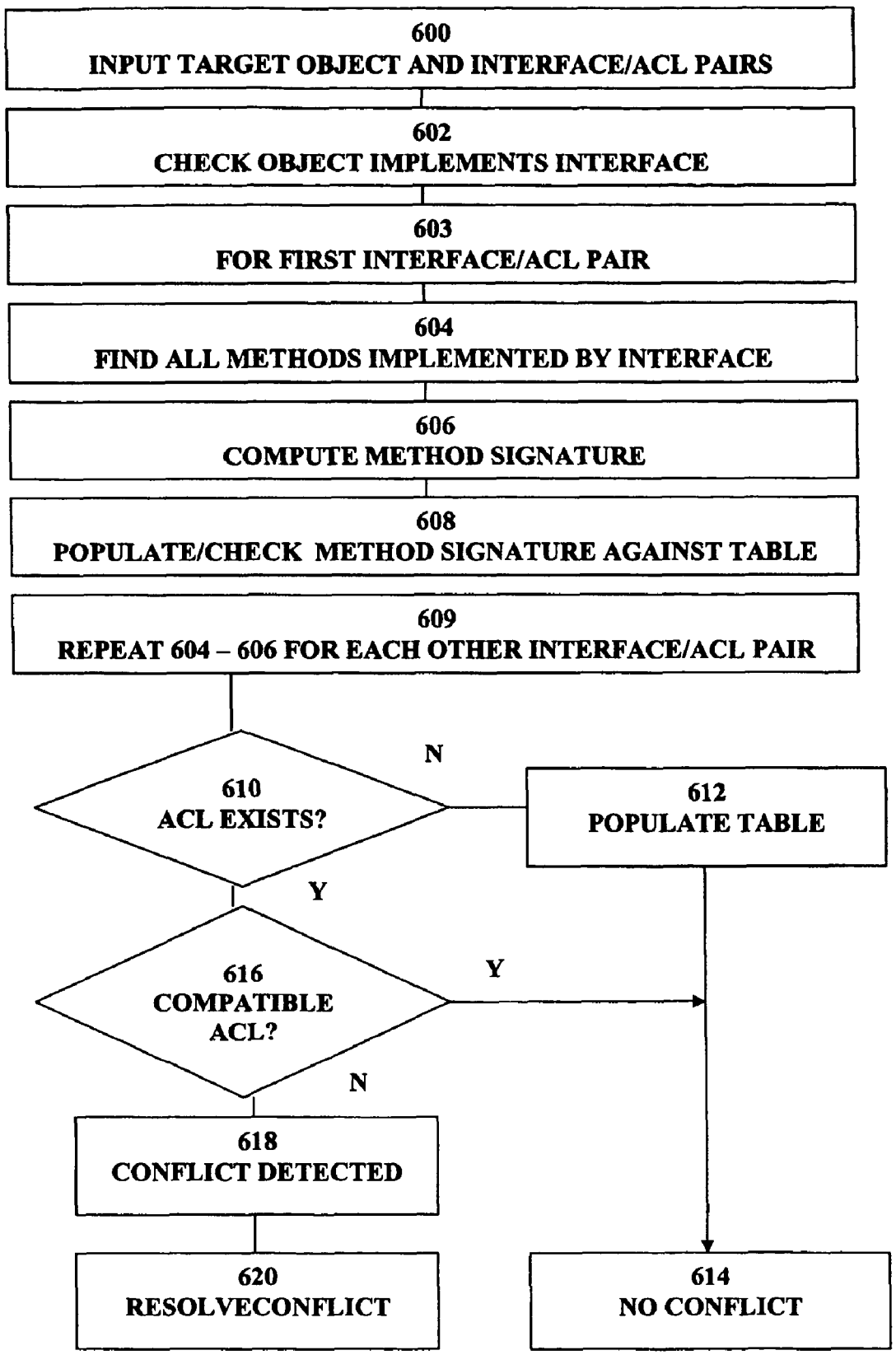
FIG. 6 is a flow diagram showing in more detail a process of identifying conflicts during method invocation.
Figure 8:
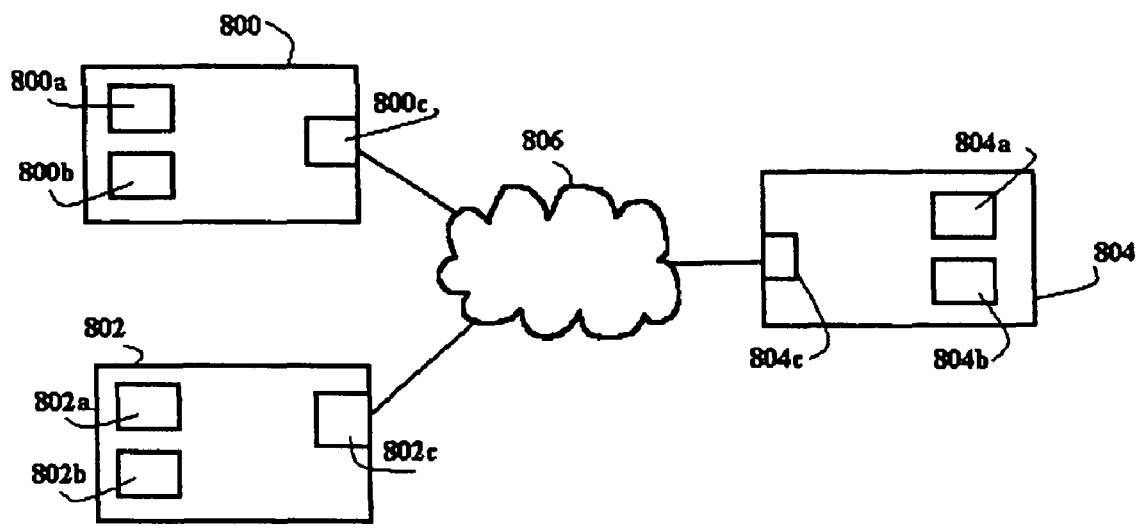
FIG. 8 is a schematic diagram showing a computer system upon which the method described herein can be implemented.

The process described herein can be understood in more detail with reference to FIG. 6 and the following exemplary code:

Listing 1

```
// Detects whether there is a conflict in the proposed set
of access control
// policies applied to groups of methods described herein
by interfaces
conflictDetection(Object In, List_of_{Interface intf,
ACL acl} req,
                                        HashTable results) {
    for every entry X in req {
                checkImplementsIntf(In, X.intf);
                Set M = fmdMethods(X.intf, new Set( ));
                for every entry meth in M {
                    methName = hashName (meth);
                    old = results.get(methName);
                    if ((old EQUALS null) OR (X.acl
                    EQUALS old)) {
                        results.set(methName, X.acl);
                    } else {
                        RAISE "conflicted detected"
                        exception;
                    }
                }
    }
}
```

In particular, at step 600 the inputs to the process are a list of interface/ACL pairs and an object that it is desired to protect with those policies. The interface/ACL pairs are, for example, defined in the programmatic description setting out how to create the object as an instance of a class, or may be read from a file or obtained in any appropriate manner. At step 602 in the "checkImplementsIntf" step a check is carried out to ensure that, for every interface/ACL pair associated with a target object, the object implements that interface for example as follows:

Listing 2

```
// Ensure that the object implements the interface we want to protect.
    checkImplementsIntf(Object in, Interface intf) {
if in is not an instance of intf {
        RAISE "conflict detected: incompatible interface";
    }
}
```

At step 603 first interface/ACL pair, is selected and at step 604 all methods implemented by the interface (or any of its parent interfaces) are found for example, by introspecting the interfaces at run-time by using Java reflection mechanisms— which are well known to the skilled reader as a method of traversing the hierarchical structure shown in FIG. 4 to obtain information about the classes/methods/interface supported by a particular object such that detailed description is not requested here. This can be achieved for example as follows:

Listing 3

```
// recursively finds all the methods implemented by an interface or any
// inherited by its superinterfaces
Set findMethods(Interface intf, Set results) {
    for all methods M in intf {
        results.add(M);
}
        for all superinterfaces superIntf of intf{
            results = findMethods(superintf, results);
        }
        return results
}
```

In step 606, a method signature (methName) is computed as a function of the method name itself e.g. GET ITEMS and the arguments attached to the method eg (1) or (abc). The combination step can be carried out by any appropriate operator, for example the method name and argument types can be concatenated to return a unique string as the hash name (hash-Name) value using any appropriate hash function as will be well known to the skilled reader:

Listing 4

```
// return a unique string for that method name and all its arguments
// static types.
String hashName(Method meth) {
Return HASH(meth.name, "-", ClassOf(meth.arg1), "-", ClassOf
(meth.arg2) ....)
}
```

Ensuring that a unique string is obtained in each case avoids problems that could otherwise arise with overloaded methods where methods with similar or the same names but different arguments can be added for example to a sub-class. Instead conflict detection is carried out in relation to a "signature" associated with the method that does not include interface information but contains a description of argument types so that we can allow duplicated method names. It will be appreciated that this step is only required in languages where the possibility of overloading is allowed.

Figure 7:
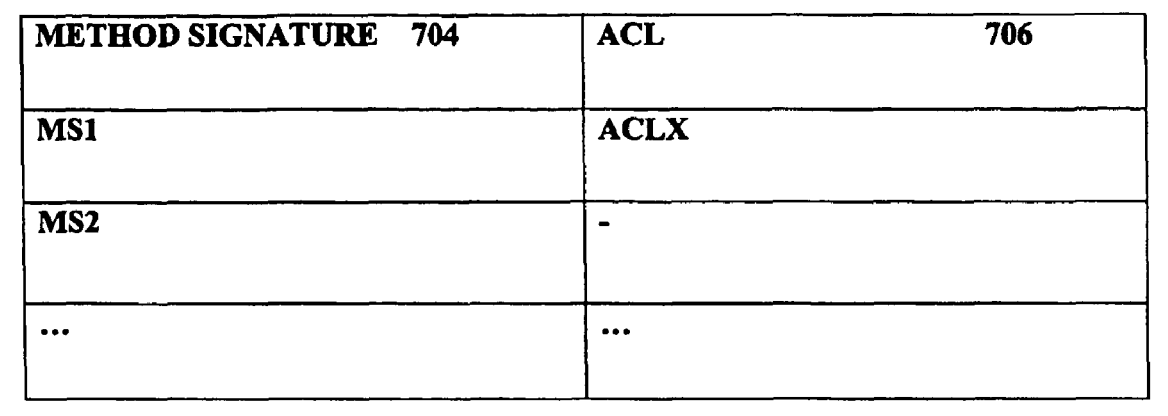

At step 608 a datastructure such as the table shown in FIG. 7 is populated with entries comprising each of the discovered methods, identified by method signature, together with the ACL associated with the interface in relation to which they were discovered. For example where a single method having method signature MS1 is discovered for interface/ACL pair X/ACLX, then ACLX is entered against MS1 in the table.

In step 609 for each of the remaining interface/ACL pairs steps 604 to 608 are repeated to obtain all of the method signatures associated with each respective interface. For each iteration the method signatures returned are checked against the existing table and the table is dynamically updated during the process. In particular, at step 610 a check is carried out to see whether an ACL already exists against a method signature. For example in the case of FIG. 7 if a method signature discovered for interface Z/ACLZ is MS2 it will be seen that no ACL is entered in the table of FIG. 7 against it. Accordingly at step 612 the table is populated for MS2 and with the new ACLZ and at step 614 a "no conflict" output is provided against that method. If, however, an ACL already exists against the method signature then at step 616 a check is carried out to establish whether it is a compatible ACL with the new ACL. For example, MS1 is discovered but ACLZ is compatible with ACLX at step 616 then an output of "no conflict" is provided at 614.

If, however, the ACL in the table is not compatible with the new derived ACL then at step 618 an output "conflict detected" is provided. At this stage the process can be stopped and the conflict resolved manually. Alternatively, at step 620 the conflict can be resolved automatically according to any appropriate policy. For example the most specific policy amongst the ACL's can be adopted or the first policy found can be adopted or indeed any other approach can be pursued as appropriate. It will be noted that the table shown in FIG. 7 can be of any appropriate type such as a look-up table and created in any appropriate manner. For example if the system is tested in a single run then the table can be populated dynamically as the process proceeds. Alternatively if the system is tested incrementally then the table can be maintained and updated through each incremental run.

Reverting to the example discussed above with reference to FIGS. 3 and 4, application of the process described herein can be further understood. Assuming that three interfaces A, B and C can be expressed:

Listing 5

```
public interface A {
    getItems (1);
}
public interface B extends A { // also includes method get item from A
    getItems (abc);
}
public interface C {
    getItems (1);
}
```

A class can then be created that implements interfaces A, B and C:

Listing 6

```
public class Inventory implements B, C {
    public Inventory ( ) {
        ...
    }
            public getItems (1) {
            ...
            }
            public getItems (abc) {
            ...
            }
}
```

An object inventory is now created as an instance of the class inventory which can be expressed:

Listing 7

Inventory inventory = new Inventory( );

If, for the previous object instance "inventory", ACL B is associated with interface B and ACL C is associated with interface C such that only managers satisfy ACL B and only executives satisfy ACL C it will be seen that conflict will appear when evaluating the ACL associated with the method "getItems (1)". Since the method is defined in both interface B (via interface A) and also in interface C, both ACL B and ACL C are relevant but are inconsistent with one another.

Then applying the process described herein, the input to the flow shown in FIG. 6 the object "inventory", the interface/

ACL pairs interface B/ACL B, interface C/ACL C are derived and, inter alia, the methods "getItems (1)" would be returned as implemented by the interfaces. The method signature would then be computed and from the table populated with the method/ACL pairs the conflict would be detected and then resolved in any appropriate manner.

It will be noted that the method getItems(abc) results in the hash value Hash["getItems_String"], different from the previous one, and therefore, no conflicts are found for that method.

It will be appreciated that the process described herein can be implemented in any appropriate manner and in any appropriate language. Furthermore the platform on which the process is implemented can be selected as required as will be apparent to the skilled reader. For example the process can be implemented in the Smart Frog distributed computing environment as described at http://www.smartfrog.org.

For example a plurality of remote entities 800, 802, 804 may implement the process including a data processors 800A, 802A, 804A, a memory 800B, 802B, 804B and an input/output interface for sending and receiving communications between the entities 800C, 802C, 804C. Each of the entities may process method calls by objects calling those methods internally to themselves or from other entities as appropriate and dynamically or statically as required to arrive at the process described herein. For example each of the entities may comprise a java virtual machine (JVM) residing on one or more common platforms.

As a result of the approaches described herein, conflicts between policies can be avoided whilst still making use of interfaces. Using interfaces to specify policy has the benefit that in statically typed languages, like Java, checks at compile time ensure that extra methods are not added unintentionally and the expected abstraction provided by an interface remains unchanged. Furthermore, this does not limit flexibility in choosing the right granularity of policy since many interfaces can be provided describing the same methods, policies being associated with the interfaces in different objects or implementations of the interface, without conflict arising.

It will further be appreciated that the approaches described herein can be implemented in the case of any multiple interface configurations or other statically defined multiple groupings of methods where a policy conflict may arise and in relation to any language, remote method invocation system and computer system as appropriate. The specific form and nomenclature applied to objects, methods and interfaces can be adopted as appropriate and it will be recognized that the terms used herein can be replaced by appropriate equivalent terms where required in implementation of other computer languages.

The invention claimed is:

1. A computer implemented process for identifying, within object-oriented programming code, conflicts between policies associated with a method, the method being invocable by an object and being a member of at least two statically defined method groupings, each method within a statically defined method grouping being associated with a policy, the process comprising:

obtaining, for a method grouping, at least some of the methods which are members of the method grouping, each of the methods obtained from the method grouping being invocable by an associated object;

associating, with each of the methods obtained from the method grouping, a corresponding method grouping policy; and for at least one of the obtained methods that also is a member of one or more other method groupings, comparing policies that are associated with the method due to its membership in multiple method groupings, to identify conflicts between the policies associated with the method.

2. A process as claimed in claim 1 in which the policy comprises an access control system.

3. A process as claimed in claim 1 in which the method grouping comprises one or more interfaces.

4. A process as claimed in claim 1 in which methods and associated policies are stored as associated entries in a look-up data structure.

5. A process as claimed in claim 4 comprising populating a look-up data structure policy entry for an associated method with an associated policy if no associated policy entry exists.

6. A process as claimed in claim 1 in which, if only one policy is associated with the method, a no-conflict state is identified.

7. A process as claimed in claim 1 in which if only compatible policies are associated with the method then a no-conflict state is identified.

8. A process as claimed in claim 1 in which if incompatible policies are associated with the method then a conflict state is identified.

9. A process as claimed in claim 8 further comprising implementing a conflict resolution policy.

10. A process as claimed in 1 further comprising computing a method signature as a function of a method name and associated method data and associating the policy with the method signature.

11. A non-transitory computer readable medium containing instructions arranged to operate a processor to implement a process for identifying, within object-oriented programming code, conflicts between policies associated with a method, the method being invocable by an object and being a member of at least two statically defined method groupings, each method within a statically defined method grouping being associated with a policy, the process comprising:

obtaining, for a method grouping, at least some of the methods which are members of the method grouping, each of the methods obtained from the method grouping being invocable by an associated object;

associating, with each of the methods obtained from the method grouping, a corresponding method grouping policy; and for at least one of the methods that also is a member of one or more other method groupings, comparing policies that are associated with the method due to its membership in multiple method groupings, to identify conflicts between the policies associated with the method.

12. An apparatus for identifying within object-oriented programming code, conflicts between policies associated with a method, the method being invocable by an object and being a member of at least two statically defined method groupings, each method within a statically defined method grouping being associated with a policy, the apparatus comprising a processor arranged to obtain, for each method grouping, at least some of the methods which are members of the method grouping, each of the methods obtained from the method grouping being invocable by an associated object, associating with each of the methods obtained from the method grouping, a corresponding method grouping policy and, for at least one of the obtained methods that also is a member of one or more other method groupings, comparing policies that are associated with the method due to its membership in multiple method groupings, to identify conflicts between the policies associated with the method.

13. A computer implemented process for identifying, within object-oriented programming code, conflicts between policies, comprising:
providing a list of interface/ACL (access control list) pairs and an associated object, where every interface/ACL pair associated with the object implements an interface from an associated interface/ACL pair;
selecting a first interface/ACL pair from the list of interface/ACL pairs;
finding a first method implemented by a first interface or a parent interface from the first interface/ACL pair;
computing a first method signature as a function of a name of the first method and arguments attached to the first method;
populating a table with entries comprising the first method signature and a first ACL from the first interface/ACL pair;
determining whether a previously populated ACL exists in the table against the first method signature;
populating the table with the first ACL and the first method signature when the table does not include the previously populated ACL, against the first method signature,
and providing a no conflict output against the first method as identified by the first method signature; and
determining whether the first ACL is compatible with the previously populated ACL when the previously populated ACL exists in the table against the first method signature and,
providing a no conflict output against the first method as identified by the first method signature when the first ACL is compatible; or providing a conflict detected output against the first method as identified by the first method signature when a conflict is detected, where the first ACL is not compatible with the previously populated ACL and resolving the conflict.

* * * * *

UNITED STATES PATENT AND TRADEMARK OFFICE
CERTIFICATE OF CORRECTION

| | |
|---|---|
| PATENT NO. | : 7,926,028 B2 |
| APPLICATION NO. | : 11/490901 |
| DATED | : April 12, 2011 |
| INVENTOR(S) | : Antonio Lain et al. |

It is certified that error appears in the above-identified patent and that said Letters Patent is hereby corrected as shown below:

In column 8, line 27, in Claim 10, delete "in 1" and insert -- in claim 1 --, therefor.

Signed and Sealed this
Twentieth Day of September, 2011

David J. Kappos
*Director of the United States Patent and Trademark Office*